US012720245B2

(12) United States Patent
Shi et al.

(10) Patent No.: US 12,720,245 B2
(45) Date of Patent: Aug. 25, 2026

(54) CONTROL METHOD AND DEVICE OF VEHICLE EXTERNAL SPEAKER AND VEHICLE EXTERNAL SPEAKER SYSTEM

(71) Applicant: PATEO CONNECT+ Technology (Shanghai) Corporation, Shanghai (CN)

(72) Inventors: Hongren Shi, Shanghai (CN); Yu Zhang, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 217 days.

(21) Appl. No.: 18/416,448

(22) Filed: Jan. 18, 2024

(65) Prior Publication Data

US 2024/0155276 A1 May 9, 2024

Related U.S. Application Data

(63) Continuation of application No. PCT/CN2021/135016, filed on Dec. 2, 2021.

(30) Foreign Application Priority Data

Sep. 22, 2021 (CN) ......................... 202111106116.X

(51) Int. Cl.
*H04R 1/02* (2006.01)
*B60R 11/00* (2006.01)
(Continued)

(52) U.S. Cl.
CPC .......... *H04R 1/026* (2013.01); *B60R 11/0217* (2013.01); *B60R 11/0264* (2013.01);
(Continued)

(58) Field of Classification Search
CPC ..... H04R 1/026; H04R 2499/13; H04S 7/303; H04S 2400/13; B60R 11/0217;
(Continued)

(56) References Cited

U.S. PATENT DOCUMENTS 11,001,199 B1 5/2021 Galliano, III et al.
11,202,150 B1 * 12/2021 Hoover .................. G06V 40/10
(Continued)

FOREIGN PATENT DOCUMENTS

CN 101489168 A 7/2009
CN 107848459 A 3/2018
(Continued)

OTHER PUBLICATIONS

The World Intellectual Property Organization (Wipo) International Search Report for PCT/CN2021/135016 Jun. 10, 2022 5 Pages (including translation).
(Continued)

*Primary Examiner* — Andrew Sniezek
(74) *Attorney, Agent, or Firm* — Anova Law Group, PLLC

(57) ABSTRACT

A control method for an on-vehicle external speaker includes in response to activation of an on-vehicle speaker mode, obtaining a relative position relationship between a user and a vehicle at a time interval, the vehicle including a plurality of on-vehicle external speakers that emit sound to outside the vehicle, determining target speakers from the plurality of on-vehicle external speakers and corresponding sound channels at least based on the relative position relationship, and controlling the target speakers to broadcast audio data of the corresponding sound channels.

17 Claims, 10 Drawing Sheets

(51) Int. Cl.

| | |
|---|---|
| ***B60R 11/02*** | (2006.01) |
| ***B60R 11/04*** | (2006.01) |
| ***H04S 7/00*** | (2006.01) |

(52) U.S. Cl.
CPC .............. *B60R 11/04* (2013.01); *H04S 7/303* (2013.01); *B60R 2011/004* (2013.01); *B60R 2300/302* (2013.01); *B60R 2300/8093* (2013.01); *H04R 2499/13* (2013.01); *H04S 2400/13* (2013.01)

(58) Field of Classification Search
CPC ................. B60R 11/0264; B60R 11/04; B60R 2011/004; B60R 2300/302; B60R 2300/8093
See application file for complete search history.

(56) References Cited

U.S. PATENT DOCUMENTS

| | | | |
|---|---|---|---|
| 2009/0022333 | A1 | 1/2009 | Yamaguchi |
| 2017/0257071 | A1 | 9/2017 | Goeppner |
| 2018/0063640 | A1 | 3/2018 | Lee |
| 2019/0356985 | A1 | 11/2019 | Milne et al. |
| 2021/0168508 | A1 | 6/2021 | Walther et al. |

FOREIGN PATENT DOCUMENTS

| | | | |
|---|---|---|---|
| CN | 207589144 | U | 7/2018 |
| CN | 110032156 | A | 7/2019 |
| CN | 111182382 | A | 5/2020 |
| JP | 2006173811 | A | 6/2006 |
| JP | 2017152864 | A | 8/2017 |
| JP | 2017199317 | A | 11/2017 |
| JP | 2020191539 | A | 11/2020 |
| WO | 2018076540 | A1 | 5/2018 |

OTHER PUBLICATIONS

The European Patent Office (EPO) The Extended European Search Report for Application No. 21958192.3 Mar. 4, 2025 13 Pages.
The European Patent Office (EPO) The Partial Supplementary European Search Report for Application No. 21958192.3 Dec. 11, 2024 15 Pages.

* cited by examiner

Determine distances of the plurality of on-vehicle external speakers relative to the user based on the relative position relationship
S223
Determining a speaker closest to the user as a center speaker
S224

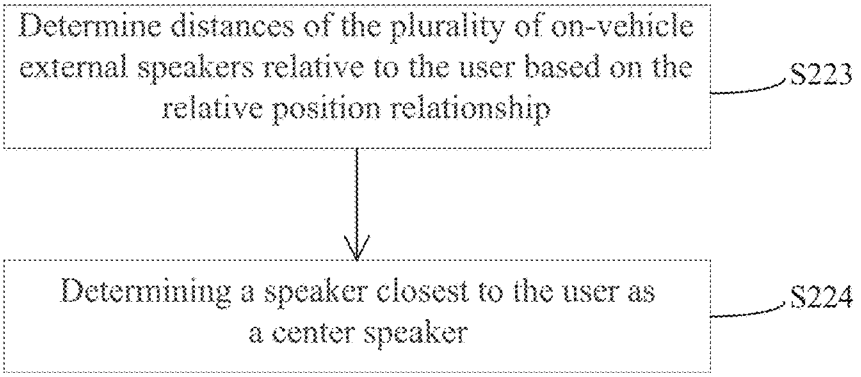

FIG. 7
In response to the relative distance exceeding a predetermined distance, generate a moving path of the vehicle
S410
Control the vehicle to move according to the moving path.
S420

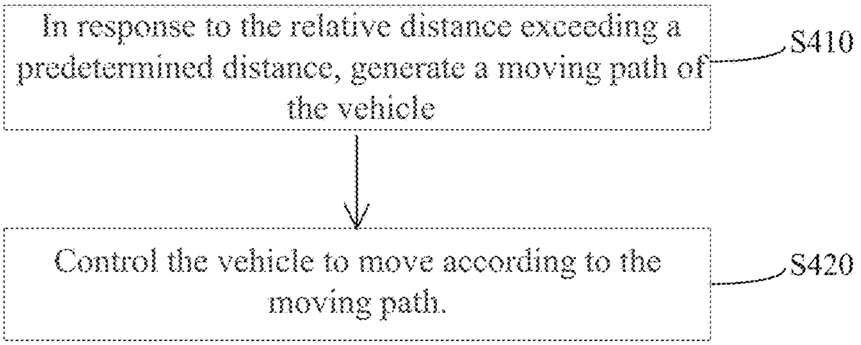

FIG. 8A
410
Based on the relative distance between the user and the vehicle, the angle of the user relative to the vehicle, and the predetermined distance, an initial moving path is generated
S411
Obtain first obstacle information on the initial moving path
S412
In response to a first obstacle existing on the initial moving path, adjust the initial moving path based on the first obstacle information to generate the moving path
S413

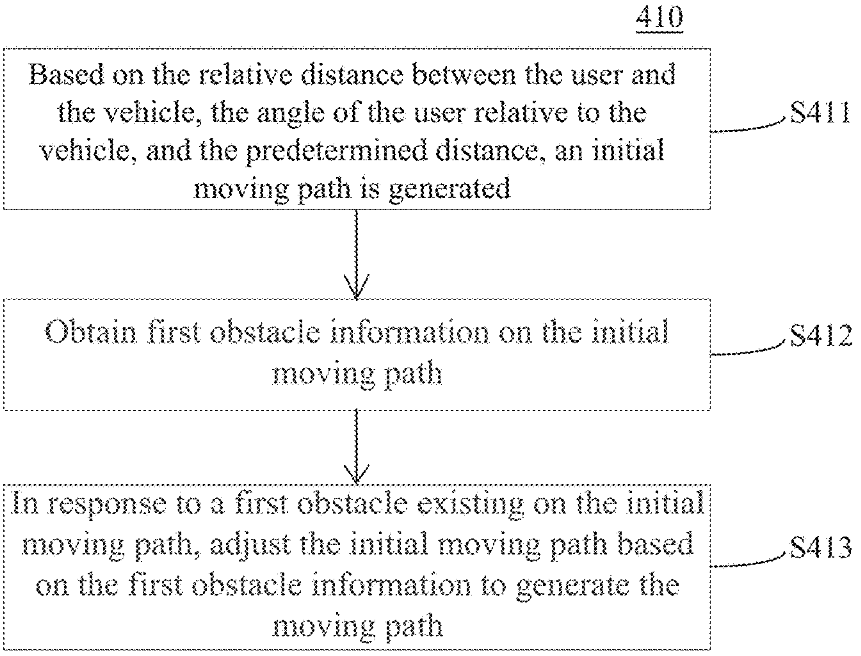

FIG. 8B 1100
1101
Memory
1104
RAM
1106
Storage system
1105
Cache
Program module
1107
1102
Processor
1103
1109
Monitor
I/O Interface
1110
Network adapter
1111
External apparatus
1108

CONTROL METHOD AND DEVICE OF VEHICLE EXTERNAL SPEAKER AND VEHICLE EXTERNAL SPEAKER SYSTEM

CROSS-REFERENCE TO RELATED APPLICATION

The present disclosure is a continuation of International Application No. PCT/CN2021/135016, filed Dec. 2, 2021, which claims priority to Chinese Patent Application No. 202111106116.X, filed on Sep. 22, 2021, the entire contents of both of which are incorporated herein by reference.

TECHNICAL FIELD

The present disclosure relates to the on-vehicle field and, more particularly, to an on-vehicle external speaker system and a control method and a control device for an external speaker.

BACKGROUND

With the development of the automobile industry, the number of automobiles is increasing. With the improvement in living standards, vehicles are widely used for transportation, and users have increasingly higher requirements for vehicle configurations. Moreover, with the continuous popularity of vehicles, user requirements for vehicles are no longer limited to a single transportation tool. With the development of technology, the space of a vehicle is constantly expanding outwards and is no longer limited to the inside of the vehicle, but extends to the outside of the vehicle, which changes the understanding of the vehicle.

SUMMARY

Embodiments of the present disclosure provide a control method for an on-vehicle external speaker. The method includes in response to activation of an on-vehicle speaker mode, obtaining a relative position relationship between a user and a vehicle at a predetermined time interval, the vehicle including a plurality of on-vehicle external speakers that emit a sound to outside the vehicle, determining target speakers from the plurality of on-vehicle external speakers and corresponding sound channels at least based on the relative position relationship, and controlling the target speakers to broadcast audio data of the corresponding sound channels.

Embodiments of the present disclosure provide a control device for an on-vehicle external speaker, including one or more processors and one or more memories. The one or more memories are coupled with the one or more processors and storing instructions that, when executed by the one or more processors, cause the one or more processors to in response to activation of an on-vehicle speaker mode, obtain a relative position relationship between a user and a vehicle at a predetermined time interval, the vehicle including a plurality of on-vehicle external speakers that emit a sound to outside the vehicle, determine target speakers from the plurality of on-vehicle external speakers and corresponding sound channels at least based on the relative position relationship, and control the target speakers to broadcast audio data of the corresponding sound channels.

Embodiments of the present disclosure further provide an onboard external speaker system, including a positioning device, a plurality of on-vehicle external speakers, and a control device. The positioning device is arranged at a vehicle. The plurality of on-vehicle external speakers are arranged at the vehicle emitting a sound outside. A control device is communicatively connected to the positioning device and the plurality of onboard external speakers and configured to, in response to starting an on-vehicle speaker mode, obtain relative position relationship between a user and the vehicle through a mobile apparatus of the user and the positioning device at a predetermined time interval, determine a target speaker from the plurality of on-vehicle external speakers and a sound channel corresponding to the target speaker, and control the target speaker to play audio data of the corresponding sound channel.

Embodiments of the present disclosure further provide an onboard camera device. The onboard camera device can be configured to obtain an image of the environment outside the vehicle and detect obstacles by performing image recognition on the image of the environment outside the vehicle to obtain a relative position relationship between the user and the vehicle at a predetermined time interval. The on-vehicle camera device can include one or more camera devices that are fixedly mounted or subsequently added to the vehicle.

BRIEF DESCRIPTION OF THE DRAWINGS

FIG. 7 is another schematic flowchart showing process S220 in FIG. 4.

FIG. 8A is a schematic flowchart of another control method according to some embodiments of the present disclosure.

FIG. 8B is a schematic flowchart of the control method in FIG. 8A.

REFERENCE NUMERALS

Figure 1:
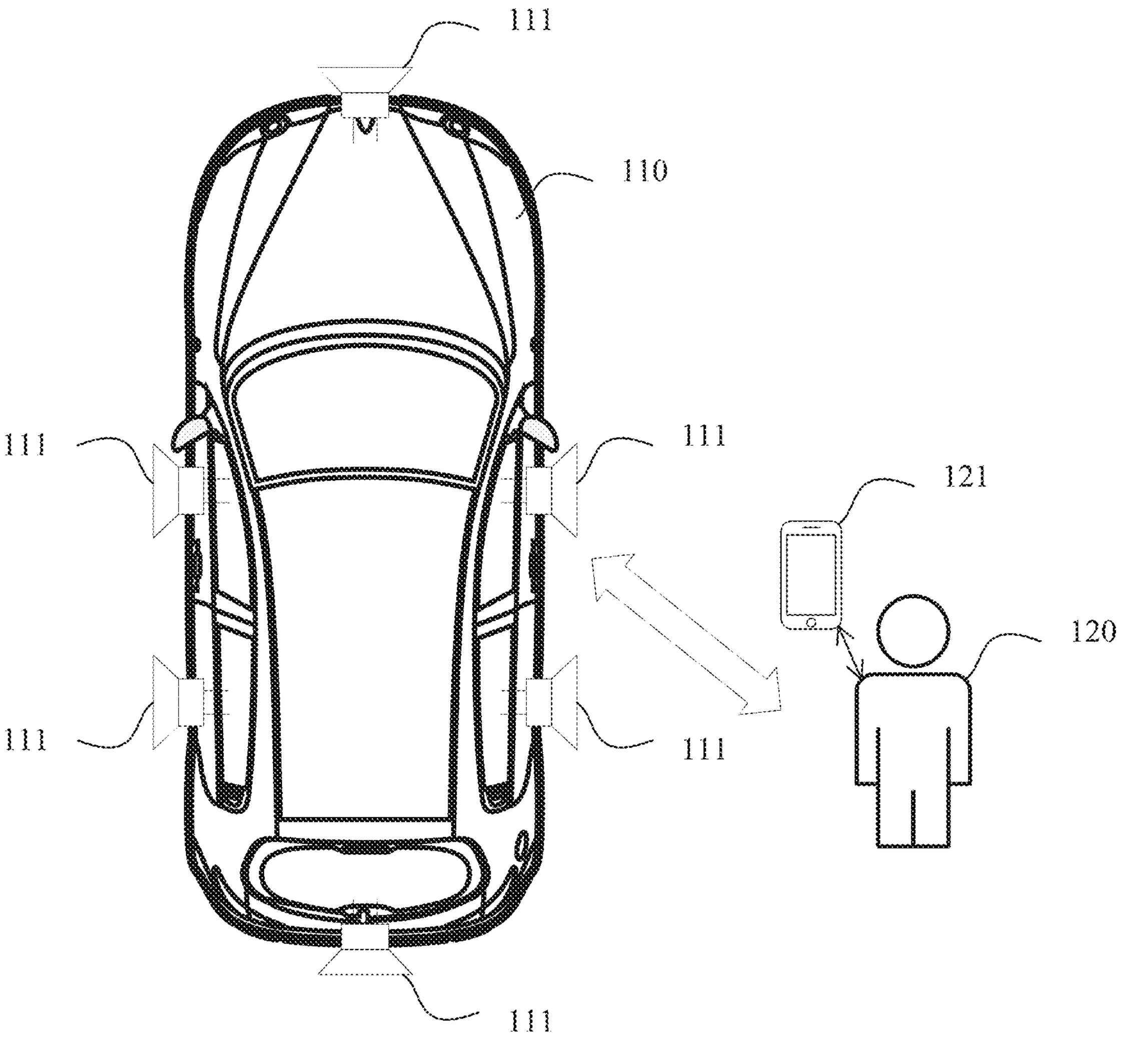
FIG. 1 is a schematic diagram of an application scene according to some embodiments of the present disclosure.

| | |
|---|---|
| 110 and 110' Vehicle | 111 and 230 On-vehicle external speaker |
| 120 User | 121 Mobile apparatus |
| 200 On-vehicle external speaker system | 210 Control device |
| 221 On-vehicle camera device | 222 Positioning device |
| 240 Power system | 250 Obstacle detection device |
| 800 First obstacle | 900 Second obstacle |
| 810, 820, and 920 Moving paths | 1100 Control device |
| 1101 Memory | 1102 Processor |
| 1103 Bus | 1104 Random access memory |
| 1105 High speed cache | 1106 Storage system |
| 1107 Program module | 1108 External apparatus |
| 1109 Monitor | 1110 Input/Output (I/O) interface |
| 1111 Network adaptor | |

DETAILED DESCRIPTION OF EMBODIMENTS

The present disclosure is described in detail in connection with the accompanying drawings and embodiments of the present disclosure. Aspects described in connection with the accompanying drawings and embodiments of the present disclosure are exemplary and cannot be understood as limiting the scope of the present disclosure.

The description provided below enables those skilled in the art to implement and utilize the present disclosure within specific application contexts. Variations and various applications within different applications are apparent to those skilled in the art. The general principles defined here can be applied to a broad range of embodiments. Therefore, the present disclosure is not limited to the specific embodiments of the present disclosure but should conform to the broadest scope consistent with the principles and novel features of the present disclosure.

In the detailed description below, many specific details are provided to offer a thorough understanding of the present disclosure. However, it is apparent to those skilled in the art that the present disclosure can be implemented without being limited to these details. That is, the known structures and devices can be shown in block diagrams without details to avoid obscuring the present disclosure.

All documents and references submitted concurrently with and opened to the public in conjunction with the present specification are incorporated into this document by reference. Unless otherwise stated directly, all features disclosed in the present specification (including any accompanying claims, abstract, and drawings) can be replaced by alternative features used to achieve the same, equivalent, or similar purposes. Thus, unless explicitly stated otherwise, each feature disclosed is just one example of a set of equivalent or similar features.

The terms such as "left," "right," "front," "rear," "top," "bottom," "up," "down," "clockwise," and "counterclockwise" are employed solely for convenience and do not imply any specific fixed direction. In fact, they are used to reflect the relative positions and/or orientations of various parts of an object. Furthermore, the terms "first" and "second" are used for descriptive purposes and should not be understood as indicative of relative importance.

Further, good, furthermore, and better are simple starting points for elaborating another embodiment based on previous embodiments. The content after further, good, furthermore, and better can be combined with the previous embodiments to be another embodiment. After the same embodiment, several embodiments after further, good, furthermore, and better can be combined arbitrarily into another embodiment.

The present disclosure is described in detail in connection with the accompanying drawings and specific embodiments. Aspects described in connection with the accompanying drawings and specific embodiments are merely exemplary and should not be construed as limiting the scope of the present disclosure.

As vehicles are broadly used, vehicles are not applied only as transportation tools. The space of a vehicle expands outward and is no longer limited in the vehicle but expands outside the vehicle.

Taking an on-vehicle speaker as an example, the existing on-vehicle speaker usually refers to a speaker arranged inside the vehicle and configured to broadcast audio data for a user in the vehicle. In some embodiments, a speaker is installed later to broadcast sound outside the vehicle to provide an early warning to people outside the vehicle. However, the speaker broadcasting outside the vehicle is mainly used for warning and is similar to a horn.

However, with the increasing number of vehicles and enrichment of vehicle application scenarios, application scenarios and functions of the on-vehicle speaker are expected to be expanded. For example, families may choose to drive for an outing on holidays. When the vehicle is parked outside on the lawn, the user will leave the vehicle and do activities on the lawn near the vehicle. Then, playing music can make the free time of the user more enjoyable. However, since the outdoor field is spacious, a high-quality auditory effect cannot be achieved using built-in speakers of the portable mobile apparatus (e.g., smartphone, tablet, etc.) of the user. A professional speaker is often needed. It is inconvenient for the user to equipped with a professional speaker for traveling.

As described above, to be able to build the vehicle into a large-scale soundbox for providing a stereo surrounding sound field, the present disclosure provides a control method and a control device for an on-vehicle external speaker and an on-vehicle external speaker system. Thus, the large-scale mobile soundbox can be with the user as the user travels and can be conveniently used in a spacious field to expand the application scene of the vehicle, which improves the user experience.

FIG. 1 is a schematic diagram of an application scene according to some embodiments of the present disclosure. As shown in FIG. 1, the present disclosure is applied to an on-vehicle environment. In the present disclosure, a user 120 from outside a vehicle 110 can use an on-vehicle external speaker 11 to use the vehicle as a large-scale soundbox. Thus, the user 120 can listen to audio from outside the vehicle 110. The user 120 can play and enjoy the audio through the on-vehicle external speaker 111 of the present disclosure in an outdoor setting, such as a lawn, a square, or a camping ground, or in an indoor setting, such as an underground parking lot, a spacious plant, a workshop, or an indoor sports field.

As shown in FIG. 1, to achieve a more stereo sound effect, in embodiments of the present disclosure, on-vehicle external speakers 11 are arranged at least at a front trunk cover, a left front door, a right front door, a left rear door, a right rear door, and a rear trunk door. When these external speakers are working, a stereo surrounding sound field is created.

In some embodiments, the user 120 can realize the connection with the vehicle external speaker system through the portable mobile apparatus 121. Thus, the user can control the on-vehicle external speaker 111 from outside the vehicle through the mobile apparatus 121.

Figure 2A:
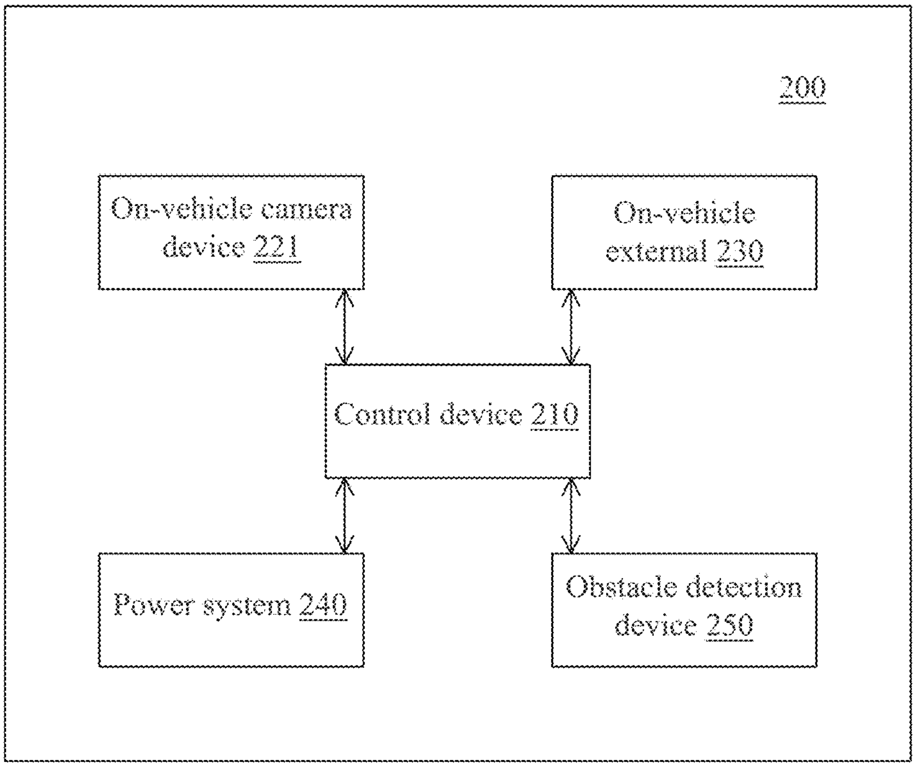
FIG. 2A is a schematic structural diagram of an on-vehicle external speaker system according to some embodiments of the present disclosure.

The on-vehicle external speaker system for applying the control method for the on-vehicle external speaker is further described in connection with FIG. 2A and FIG. 2B. As shown in FIG. 2A, the on-vehicle external speaker system 200 includes a control device 210, an on-vehicle camera device 221, and a plurality of on-vehicle external speakers 230 arranged at the vehicle for emitting sound to outside the vehicle. The control device 210 is communicatively connected to the on-vehicle camera device 221 and the plurality of on-vehicle external speakers 230.

The control device 210 can be configured to, in response to the activation of the on-vehicle speaker mode, obtain a relative position relationship between the user and the vehicle through the on-vehicle camera device 221 at a predetermined time interval, determine target speakers and corresponding sound channels from the plurality of on-vehicle external speakers 230 based on the relative position relationship, and control the target speakers to broadcast the corresponding sound channels to implement the control method for the on-vehicle external speaker of the present disclosure.

In some embodiments, as shown in FIG. 2A, the vehicle external speaker system 200 further includes a power system 240 and an obstacle detection device 250. The power system 240 and the obstacle detection device 250 are communicatively connected to the control device 210.

On one hand, in response to the relative position relationship between the user and the vehicle exceeding a predetermined distance, the control device 210 can be further configured to generate a moving path for the vehicle and control the vehicle to move according to the moving path via the power system 240.

On another hand, the control device 210 can be further configured to obtain obstacle information near the target speakers based on the on-vehicle camera device 221 and/or the obstacle detection device 250, and in response to a target speaker facing an obstacle, close the target speaker facing the obstacle or controlling the vehicle to move to avoid the obstacle via the power system 240. The obstacle can include a first obstacle and a second obstacle below. That is, the on-vehicle camera device 221 and/or the obstacle detection device 250 can have a detection capability of detecting an obstacle in a broadest sense.

The control device 210 can be regarded as a general-purpose processor, including a memory and a processor. The memory can include but is not limited to a computer-readable storage medium of the present disclosure, which stores a computer instruction. The processor can be connected to the memory and configured to perform the computer instruction stored in the memory to implement the control method for the on-vehicle external speaker of the present disclosure.

The on-vehicle camera device 221 can refer to one or more camera devices that are fixedly mounted or subsequently added to the vehicle. In the present disclosure, the on-vehicle camera device 221 can be configured to capture an image outside the vehicle to obtain user information outside the vehicle and the obstacle information outside the vehicle. The obstacle information can include the first obstacle and the second obstacle. That is, the on-vehicle camera device 221 can have a detection capability of detecting the obstacle in a broadest sense.

As shown in FIG. 1, the plurality of on-vehicle external speakers 230 are described. The plurality of on-vehicle external speakers 230 can be arranged on an inner side of the panel of the vehicle body and can be configured to emit sound to the outside the vehicle body. As shown in FIG. 1, the plurality of on-vehicle external speakers 230 (vehicle external speakers 111 in FIG. 1) can be uniformly arranged around the vehicle body to provide a stereo surrounding sound field.

The target speakers can refer to a plurality of on-vehicle external speakers for emitting sound to the outside the vehicle, which is selected from the plurality of on-vehicle external speakers 230 arranged on the vehicle according to the control method of the present disclosure.

As described above, since the plurality of on-vehicle external speakers 230 can be distributed at the front trunk cover, the left front door, the right front door, the left rear door, the right rear door, and the rear trunk door of the vehicle 110, a stereo surrounding sound field can be provided by these external speakers. When the user is at different positions and faces different angles, the stereo surrounding sound field can be provided by controlling these external speakers. The stereo surrounding sound field of the present disclosure can be understood from a broadest sense and a minimum requirement. For example, when the user is at the head of the vehicle and faces to the left side of the vehicle, a front and rear surrounding feeling can be realized by controlling the on-vehicle external speakers 230 on the left side of the vehicle to broadcast audio corresponding to front sound channels and controlling the on-vehicle external speakers 230 on the right side of the vehicle to broadcast audio corresponding to rear sound channels. Since different on-vehicle external speakers broadcast audio data corresponding to different sound channels, sound channel waveforms of the audio data corresponding to different sound channels may not same and create a stereo effect.

The power system 240 can refer to a power system of an existing or future vehicle. The power of the engine/electric motor can be transferred to the entire mechanical arrangement process of the wheels through a series of power transmissions. By controlling the power system 240, the vehicle can be transformed into a large-scale mobile sound box to enrich the application scene of the vehicle.

The obstacle detection device 250 can refer to various sensors for detecting obstacles, including but are not limited to radar sensors, laser ranging sensors, infrared sensors, etc. On another hand, the obstacle detection device 250 may also refer to an on-vehicle camera device that obtains an image of the environment outside the vehicle and detects obstacles by performing image recognition on the image of the environment outside the vehicle. The obstacle can include the first obstacle and the second obstacle. That is, the on-vehicle camera device 221 and/or the obstacle detection device 250 can have the detection capability of detecting the obstacle in the broadest sense.

In some other embodiments of the present disclosure, another on-vehicle external speaker system is provided. As shown in FIG. 2B, the device for obtaining the relative position relationship between the user and the vehicle is not the on-vehicle camera device but a positioning device 222. The devices for obtaining the relative position relationship between the user and the vehicle are different. Other members of the on-vehicle external speaker systems of FIG. 2A and FIG. 2B are the same. For the description of the other members, reference can be made to above, which is not repeated here.

Figure 2B:
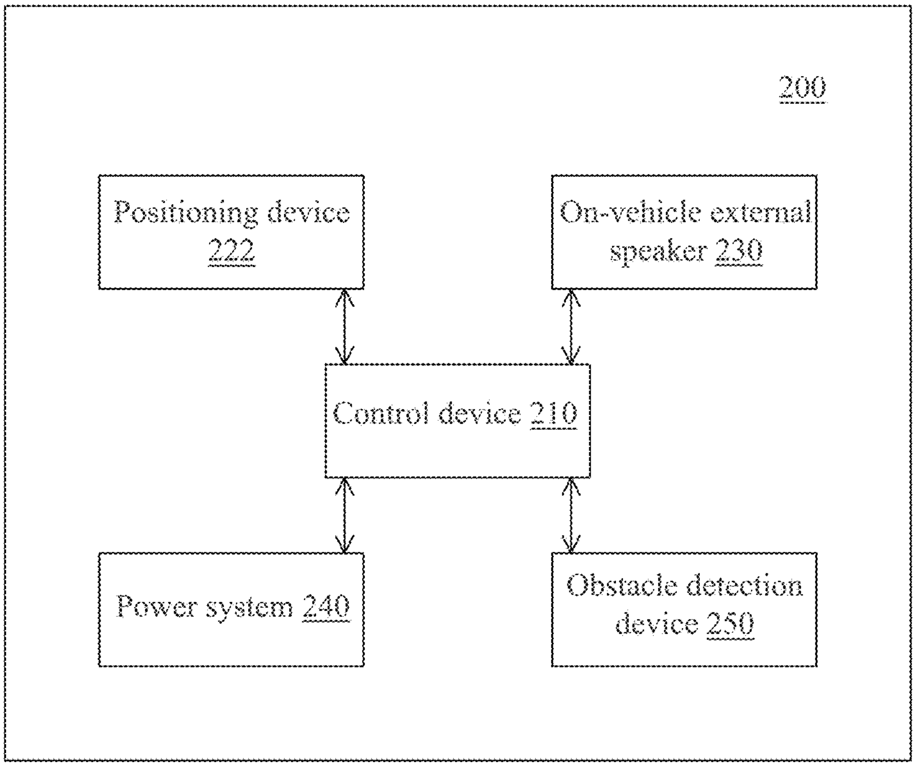
FIG. 2B is a schematic structural diagram of another on-vehicle external speaker system according to some embodiments of the present disclosure.

In embodiments shown in FIG. 2B, the control device 210 is configured to in response to the activation of the on-vehicle speaker mode, obtain the relative position relationship between the user and the vehicle through the mobile apparatus 121 of the user and the positioning device 222 at a predetermined time interval. In some embodiments, the obstacle information around the vehicle (e.g., the target speaker) may need to be obtained by the obstacle detection device 250.

In embodiments shown in FIG. 2B, the positioning device 222 is implemented using Bluetooth positioning technology, Ultra Wide Band (UWB) technology, or SparkLink/NearLink technology. UWB is a carrier-free communication technology, that can transmit data using a non-sinusoidal narrow pulse ranging from nanosecond to microsecond. By transmitting a signal with extremely low power over a wide frequency spectrum, UWB can achieve data transmission rates ranging from hundreds of Mbit/s to several Gbit/s within a range of about 10 meters. UWB has a strong anti-interference performance, a high transmission rate, and a large system capacity. The transmission power of the UWB system is very small, and the communication apparatus can realize communication with a transmission power of less than 1 mW. With the low transmission power of UWB, the working time of the system power source can be greatly extended. Meanwhile, the mobile apparatus 121 of the user may need to have a corresponding positioning function.

Figure 3:
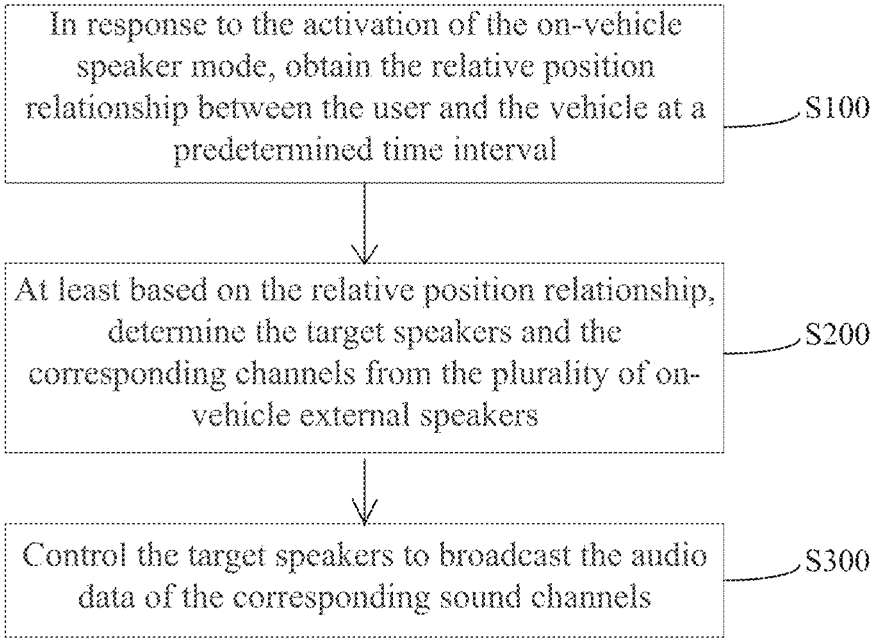
FIG. 3 is a schematic flowchart of a control system for an on-vehicle external speaker according to some embodiments of the present disclosure.

The control method for the on-vehicle external speaker of the present disclosure is described below in connection with the application scene and the on-vehicle external speaker system of the present disclosure. As shown in FIG. 3, the control method for the on-vehicle external speaker of the present disclosure includes the following processes.

At S100, in response to the activation of the on-vehicle speaker mode, the relative position relationship between the user and the vehicle is obtained at a predetermined time interval.

At S200, at least based on the relative position relationship, the target speakers and the corresponding sound channels are determined from the plurality of on-vehicle external speakers.

At S300, the target speakers are controlled to play the audio data of the corresponding sound channels.

In process S100, the on-vehicle speaker mode can refer to a mode in which the vehicle is used as a large-scale mobile soundbox capable of providing a stereo surrounding sound field. The on-vehicle speaker mode is usually turned on after parking when the user can move from the internal space of the vehicle to the outer space of the vehicle and wants to use the vehicle as a soundbox. The on-vehicle speaker mode can be activated by the user instruction or can be activated automatically according to a predetermined control logic.

In the present disclosure, the vehicle can be used as the large-scale soundbox for providing a stereo surrounding sound field. In the on-vehicle speaker mode, to provide the stereo surrounding sound field to the user, the relative position relationship between the user and the vehicle can be obtained at the predetermined time interval. Thus, when the relative position relationship between the user and the vehicle changes to affect the sound field, the target speakers that are instructed to operate and the corresponding sound channels can be adjusted in time.

Those skilled in the art can set different predetermined time intervals as needed. That is, if the predetermined time interval is smaller, the present disclosure can be more sensitive. However, power consumption can be increased due to processing of large data. In some embodiments, the user can also set the expected predetermined time interval to satisfy the needs of the user.

In some embodiments, in process S100, the relative position relationship between the user and the vehicle can be obtained through the on-vehicle camera device 230. The on-vehicle camera device 230 can be a panoramic or wide-angle camera arranged on the vehicle, which can be configured to obtain the image outside the vehicle. Thus, in some embodiments, the on-vehicle camera device 230 can be configured to represent the position of the vehicle. Thus, the current relative position relationship between the user and the vehicle can be determined through the user image obtained by the on-vehicle camera device 230.

In some other embodiments, in process S100, the relative position relationship between the user and the vehicle can be obtained through a mobile apparatus 121 of the user 120 and a positioning device 222 of the vehicle 110. In some embodiments, the mobile apparatus 121 and the positioning device 222 can adopt the Bluetooth positioning technology, the UWB technology, or SparkLink/NearLink technology to realize positioning. Further, to obtain the relative position relationship between the user and the vehicle, the current position of the user and the current position of the vehicle may need to be obtained through the mobile apparatus 121 and the positioning device 222. Then, the relative position information can be obtained based on the current position of the user and the current position of the vehicle. In some other embodiments, the relative position relationship between the user and the vehicle may be directly obtained based on the Bluetooth positioning technology, the UWB technology, or SparkLink/NearLink technology.

In some other embodiments, the positioning device may include any device capable of determining the position information of the user and the vehicle. For example, the onboard camera device can also be configured to capture images to determine the position information of the user and the vehicle. Thus, the positioning device can also include the onboard camera device.

Moreover, in process S100, the obtained relative position relationship can include a relative distance, a relative angle, etc. between the user and the vehicle.

Figure 4:
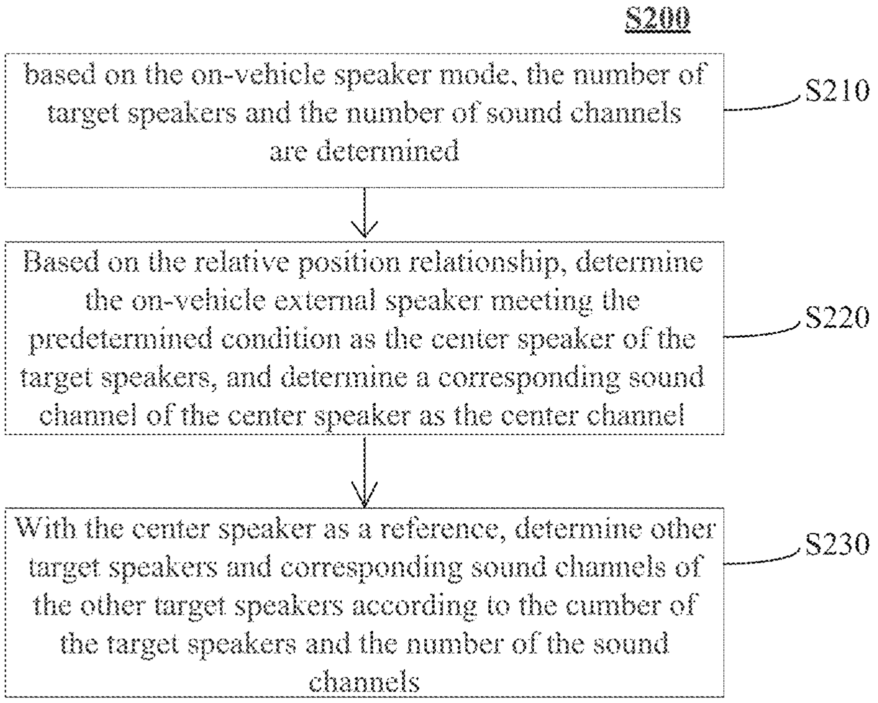
FIG. 4 is a schematic flowchart showing process S200 in FIG. 3.

Refer to FIG. 4, process S200 is further described. In some embodiments, as shown in FIG. 4, process S200 further includes the following processes.

At S210, based on the on-vehicle speaker mode, the number of target speakers and the number of sound channels are determined.

At S220, based on the relative position relationship, the on-vehicle external speaker meeting the predetermined condition is determined as the center speaker of the target speakers, and a corresponding sound channel of the center speaker is determined as the center sound channel.

At S230, with the center speaker as a reference, other target speakers and corresponding sound channels of the other target speakers are determined according to the number of the target speakers and the number of the sound channels.

Figure 5A:
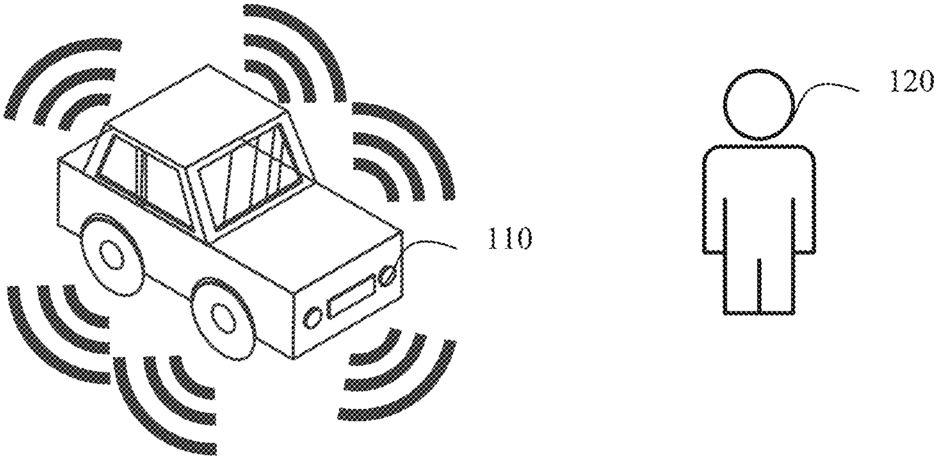
FIG. 5A is a schematic diagram showing a full surrounding mode of an on-vehicle speaker mode according to some embodiments of the present disclosure.
Figure 5B:
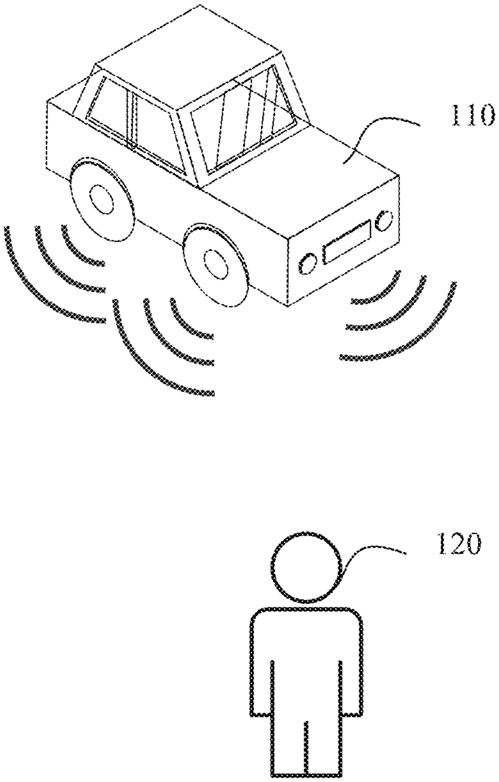
FIG. 5B is a schematic diagram showing a half surrounding mode of an on-vehicle speaker mode according to some embodiments of the present disclosure.

Refer to FIG. 5A and FIG. 5B, the on-vehicle speaker mode in process S210 is explained. In the present disclosure, the on-vehicle speaker mode includes the mode of using the vehicle as the large-scale mobile soundbox for providing the stereo surrounding sound field. In some other embodiments, different on-vehicle soundbox modes can be predetermined, for example, a full surrounding mode shown in FIG. 5A and a half surrounding mode shown in FIG. 5B.

In the full surrounding mode, all the on-vehicle external speakers 230 can be configured to emit sound to the outside (i.e., all the on-vehicle external speakers 230 being selected as target speakers). Moreover, because all the on-vehicle external speakers 230 are working, more sound channels can be arranged, for example, a left channel, a left center channel, a center channel, a right center channel, a right channel, a broadcast channel corresponding to a distance sound, a bass channel, etc.

As shown in FIG. 5A, even if the user 120 is located on the right side of the vehicle 110, the on-vehicle external speakers still emit sound to the surroundings to form different sound channels for far and close by, and high and low sounds to provide an immersive auditory effect to the user.

In the half-surrounding mode, only some speakers can be selected from the on-vehicle speakers 230 to emit a sound to the outside. The selected on-vehicle external speakers for emitting sound to the outside can be the target speakers. In the half-surrounding mode, since only some on-vehicle external speakers are selected as the target speakers, various sound channels cannot be satisfied. For example, when only left and right channels are included, i.e., at least the left and right sound channels need to be selected, the sound channels satisfying a basic auditory requirement can be selected. For example, at least the center sound channel needs to be ensured. Then, other sound channels can be determined according to the number of the target speakers.

As shown in FIG. 5B, since the user 120 is in the right front of the vehicle 110, only the on-vehicle external speakers on the right side and the front of the vehicle emit sound to the outside. Thus, the basic auditory requirement can still be ensured. In the half-surrounding mode, since the number of speakers for working is fewer than the number of speakers in the full-surrounding mode, the power consumption caused by the speakers can be effectively reduced. When the on-vehicle speaker mode needs to be used for a long time, or when the power supply of the vehicle is not good, the half-surrounding mode can be used.

Figure 6A:
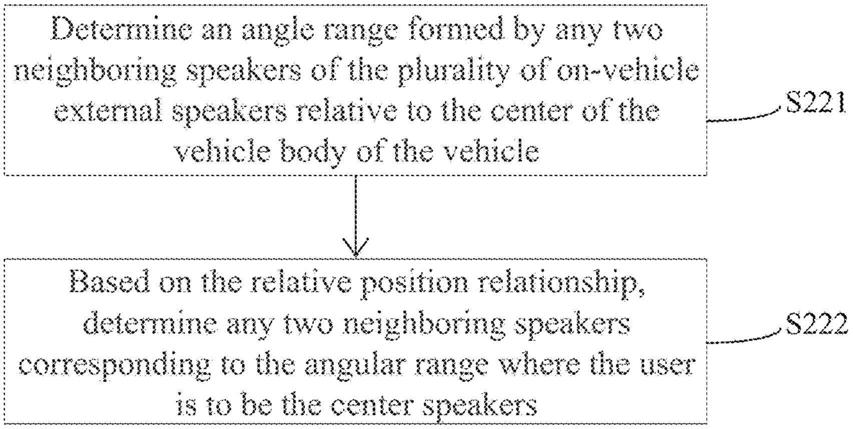
FIG. 6A is a schematic flowchart showing process S220 in FIG. 4.
Figure 6B:
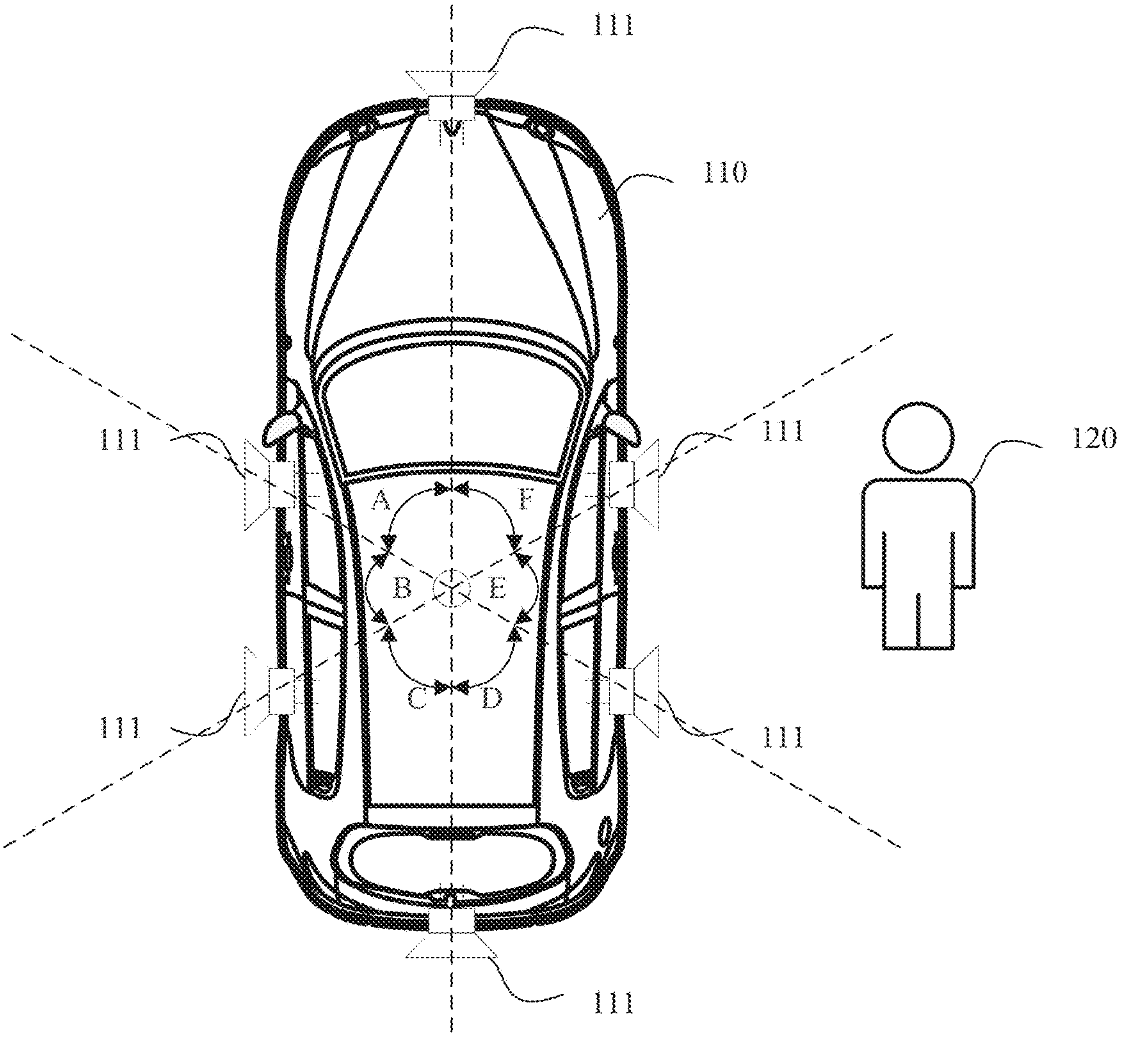
FIG. 6B is a schematic diagram showing an angle range formed by any two neighboring speakers in FIG. 6A.

Refer to FIG. 6A, FIG. 6B, and FIG. 7, process S220 is explained. FIG. 6A and FIG. 6B illustrate an embodiment of process S220. FIG. 7 illustrates another embodiment of process S220.

First, as shown in FIG. 6A, process S220 further includes the following processes.

At S221, an angle range formed by any two neighboring speakers of the plurality of on-vehicle external speakers relative to the center of the vehicle body of the vehicle is determined.

At S222, based on the relative position relationship, any two neighboring speakers corresponding to the angular range where the user is are determined to be the center speakers.

Refer to FIG. 6B, the angle range formed by the two neighboring speakers relative to the center of the vehicle body in process S221 is explained. As shown in FIG. 6B, center point O of the vehicle body of the vehicle is determined first. Then, point O can be connected to the vehicle external speakers. Thus, the space around the vehicle can be divided into six areas of A to F. Two neighboring speakers can be used as boundaries for each area. Then, the two neighboring speakers can be considered to be in the middle relative to the user in the area of the two neighboring speakers. For example, the speaker in the front of the vehicle and the speaker in the left front of the vehicle, the pair of the two neighboring speakers can respond to area A. Thus, the relative position of the user in area A can be in the middle relative to the two neighboring speakers.

Subsequently, in process S222, based on the relative position relationship, the angle range of the user can be determined. Then, the two neighboring speakers corresponding to the angle range can be determined to be the center speakers. The sound channels of the center speakers can be determined to be the center channels.

Refer to FIG. 6B, after the six areas A to F formed by any two adjacent speakers relative to the center of the vehicle body are determined, the user is determined to be in area E according to the relative position relationship. Thus, the right front speaker and the right rear speaker forming area E can be determined to be the center speakers.

In some other embodiments, as shown in FIG. 7, process S220 further includes determining distances of the plurality of on-vehicle external speakers relative to the user based on the relative position relationship (S223) and determining a speaker closest to the user as a center speaker (S224).

As shown in FIG. 6A and FIG. 6B, the center speaker is arranged by considering the center angle of the relative position. As shown in FIG. 7, the center speaker is arranged directly by considering the closest relative distance.

If the relative position relationship between the user and the vehicle has been obtained in process S100, since the positions of the speakers on the vehicle are fixed, the distances of the plurality of on-vehicle external speakers relative to the user can be determined based on the relative position relationship in process S223.

As shown in FIG. 6B, in the relative position relationship between the vehicle 110 and the user 120, the left front speaker of the plurality of on-vehicle external speakers is closest to the user 120. The left rear speaker has a similar distance to the user 120 as the left front speaker but slightly farther. Thus, in some embodiments, when only one center speaker exists, the left front speaker can be determined as the center speaker. If two center speakers are included, the left front speaker and the left rear speaker can be determined as the center speakers.

The number of the center speakers is normally one to two. Through the surrounding mode, the number of the target speakers and the number of the sound channels can be determined, and the target speakers used as the center speakers can be determined as well as the number of the target speakers used as the center speakers. In process S230, the target speakers can be determined from the center to two sides with the center speaker as the center according to the number of the remaining target speakers and the number of the sound channels. The sound channels of the target speakers can be determined as left channels and/or right channels. In the full surrounding mode, the speaker that is far away from the center speaker can be selected to process a sound channel for sound from far away or a bass channel.

Refer to FIG. 6B, an embodiment of implementing process S230 is illustrated based on embodiments of process S220 shown in FIG. 6A. after determining the right front speaker and the right rear speaker forming area E as the center speakers, in the full surrounding mode, if the user faces the vehicle body, the speaker located between area A and area F at the front of the vehicle can be determined as the speaker for the right channel. The speaker located between area C and area D at the rear of the vehicle can be determined as the speaker for the left channel. The left front speaker and the left rear speaker forming area B can be used to process the sound channel for the sound far away or the bass channel. In some other embodiments, after determining the right front speaker and the right rear speaker forming area E as the center speakers, in the full surrounding mode, if the user faces the front of the vehicle, the speaker located between area A and area F at the front of the vehicle as the speaker for the front channel. The speaker located between area C and area D at the rear of the vehicle can be determined as the speaker for the rear channel. The left front speaker and the left rear speaker forming area B can be determined as the speakers for the left center channel.

Figure 8C:
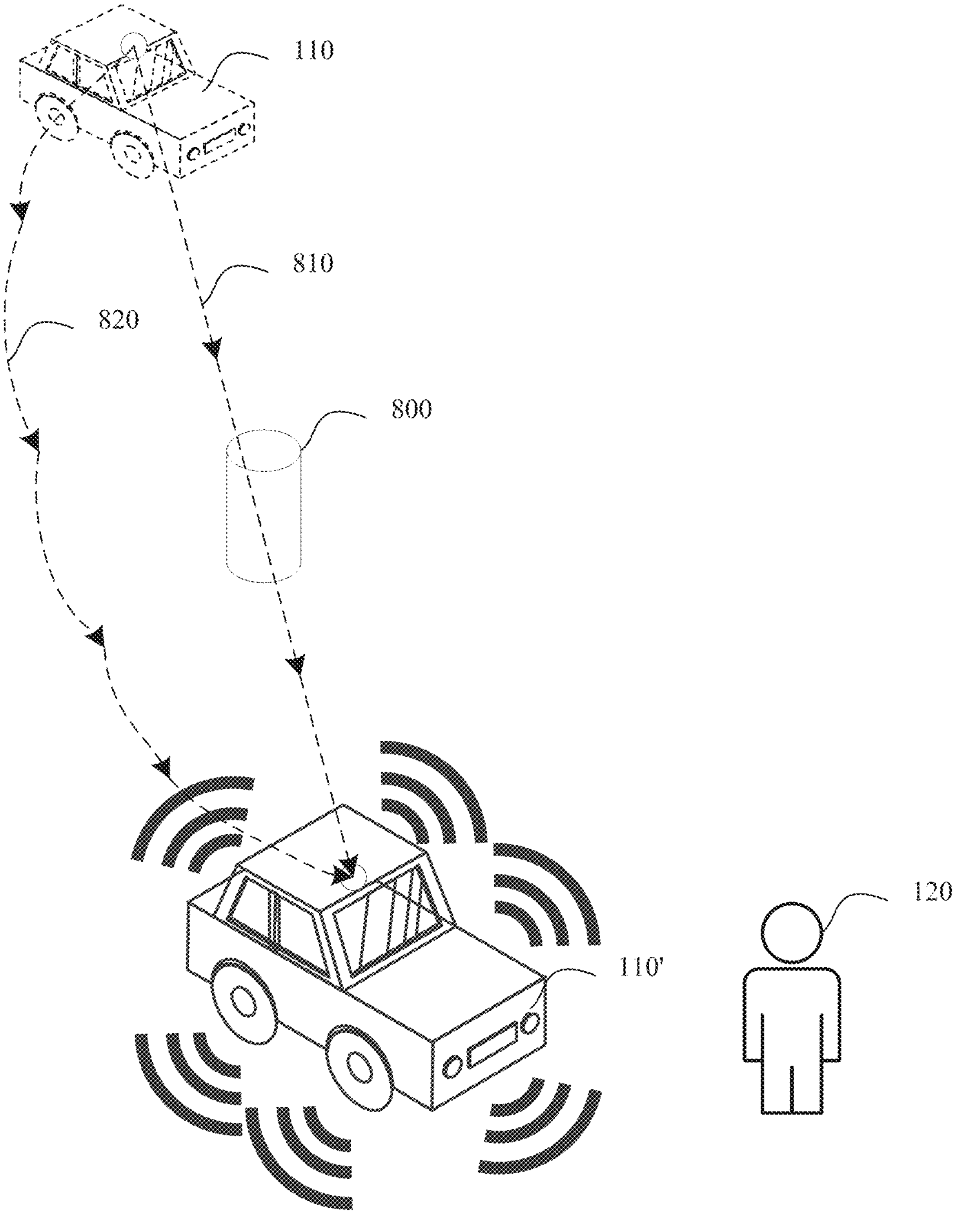
FIG. 8C is a schematic diagram showing moving paths in FIG. 8A and FIG. 8B.

Refer to FIGS. 8A-8C, another aspect of the control method of the present disclosure is described. As shown in FIG. 8A, after obtaining the relative position relationship between the user and the vehicle at a predetermined time interval, the control method further includes the following processes.

At S410, in response to the relative distance exceeding a predetermined distance, a moving path of the vehicle is generated.

At S420, the vehicle is controlled to move according to the moving path.

In some embodiments, as shown in FIG. 8B, process S410 further includes the following processes.

At S411, based on the relative distance between the user and the vehicle, the angle of the user relative to the vehicle, and the predetermined distance, an initial moving path is generated.

At S412, first obstacle information on the initial moving path is obtained.

At S413, in response to a first obstacle existing on the initial moving path, the initial moving path is adjusted based on the first obstacle information to generate the moving path.

The method shown in FIG. 8A and FIG. 8B is further described in connection with FIG. 8C. As shown in FIG. 8C, in the initial state, the relative distance between the vehicle 110 and the user 120 is relatively long. Thus, a good auditory experience cannot be provided to the user. Thus, process S410 is performed to generate the moving path of the vehicle. Then, the relative position relationship between the vehicle and the user is adjusted by controlling the vehicle to adjust the position to improve the auditory experience of the user.

Further, in process S410, to cause the vehicle 110 to be close to the user 120, the vehicle can be caused to move along a direction toward the user based on the relative angular relationship between the vehicle and the user. The relative distance between the vehicle and the user can be within the predetermined distance range. FIG. 8C shows the position where the vehicle 110' is located. Based on the principle that the straight line between two points is the shortest, if the vehicle moves to the position where the vehicle 110' is located, the moving path is determined to be the moving path 810. Then, the vehicle can be controlled to move based on the moving path 810. The moving path 810 can be considered as an initial moving path or an ideal moving path without considering the driving feasibility.

Although the ideal moving path 810 is determined, if the first obstacle exists on the ideal moving path 810, the moving path of the vehicle can be affected. To consider the first obstacle on the ideal moving path, the first obstacle can be a living body or a non-living body blocking the vehicle from moving.

In some existing or future autonomous driving technologies, if the obstacle information can be automatically detected during moving according to an optimal moving path, the obstacle information may not be considered in the present disclosure. The ideal moving path 810 can be merely output to an autonomous driving controller that can process the obstacle intelligently to control the vehicle to move according to the moving path 810 based on the power system 240 of the vehicle to avoid the obstacle intelligently.

However, if the existing driving assistance technology cannot automatically avoid the obstacle on the road, process S412 may need to be performed to generate a moving path considering the first obstacle information. In process S412, a first obstacle situation on the initial moving path 810 can be obtained through an obstacle detection device 250 and/or an on-vehicle camera device 221. As shown in FIG. 8C, a first obstacle 800 exists on the initial moving path 810. Thus, process S413 needs to be performed to adjust the initial moving path based on the first obstacle information to generate a moving route. As shown in FIG. 8C, the vehicle needs to move around the first obstacle 800 to reach the location of the vehicle 110'. Then, the moving path 820 is generated by considering the first obstacle information. Therefore, in process S420, the vehicle can be controlled to move based on the moving route 820.

Figure 9A:
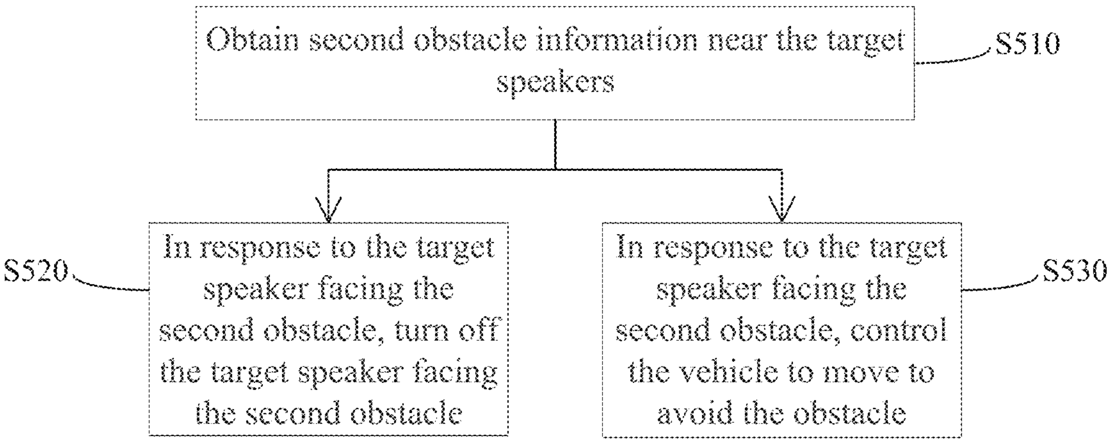
FIG. 9A is a schematic diagram of another control method according to some embodiments of the present disclosure.
Figure 9B:
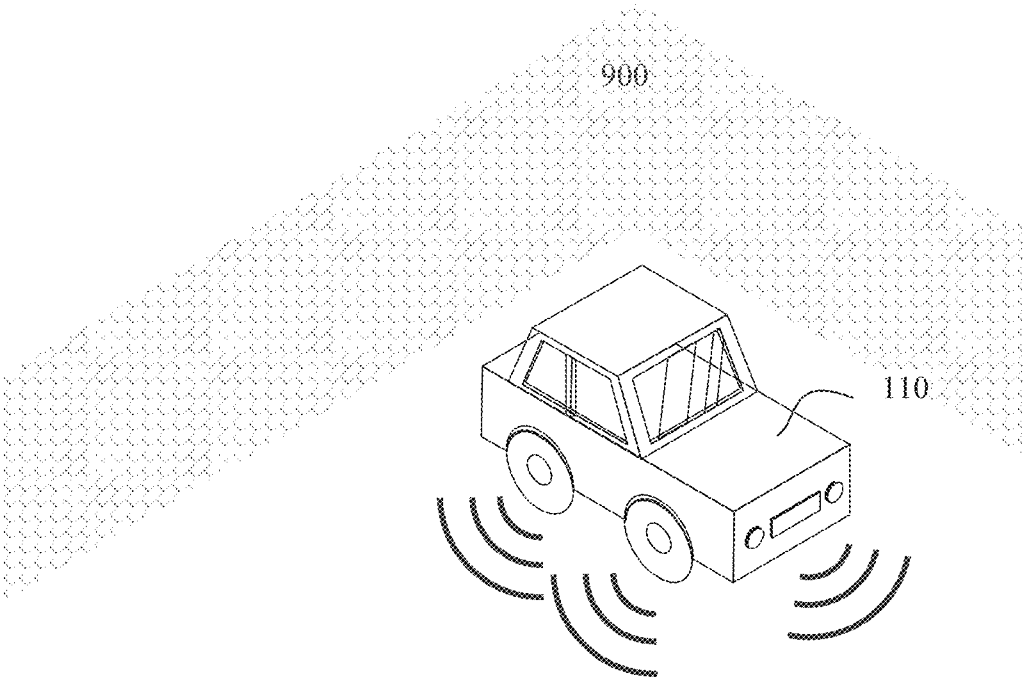
FIG. 9B is a schematic diagram showing a scene of closing a target speaker based on a second obstacle in FIG. 9A.
Figure 9C:
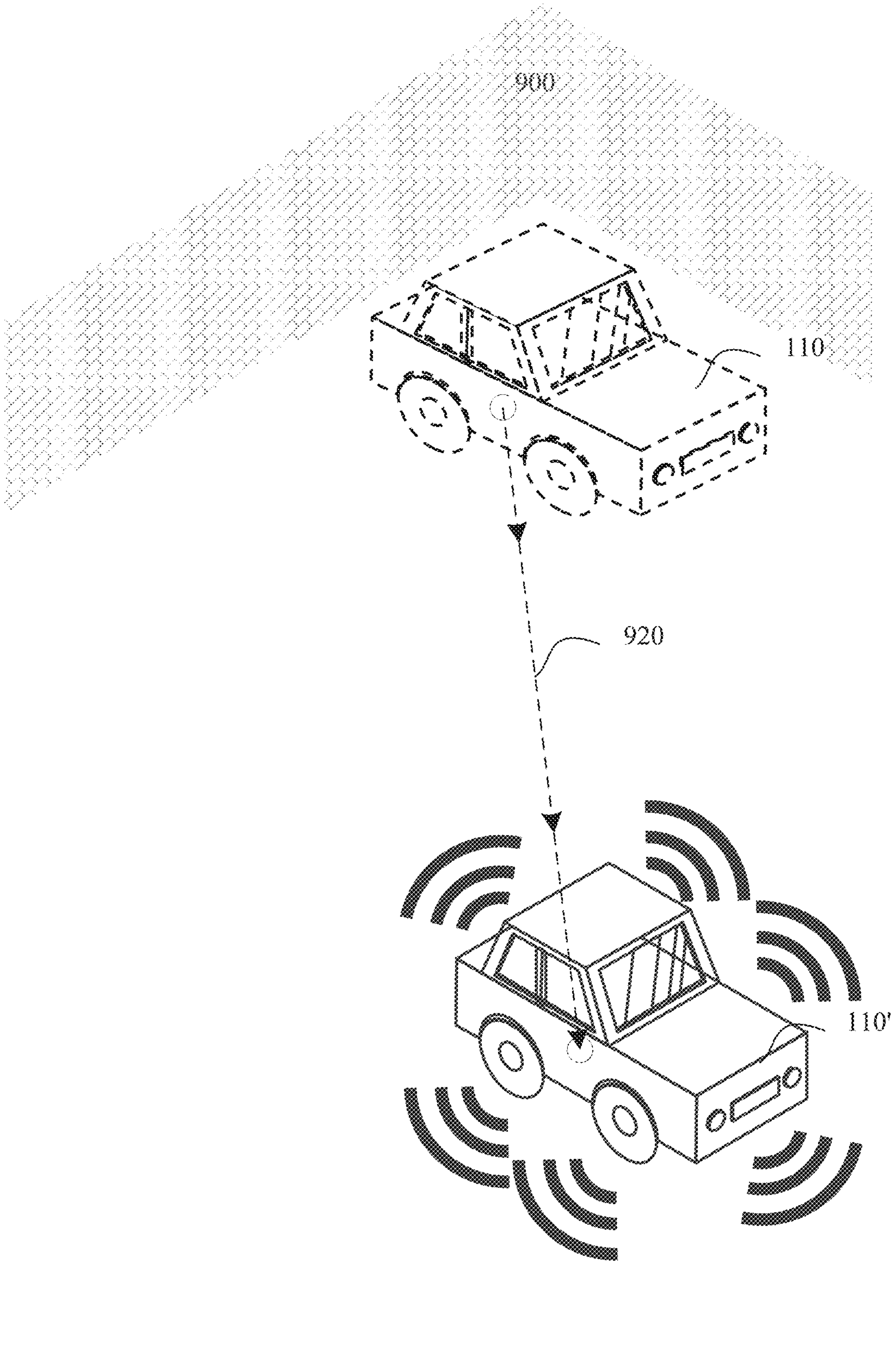
FIG. 9C is a schematic diagram showing a scene of a moving vehicle avoiding the second obstacle in FIG. 9A.

Refer to FIGS. 9A to 9C, another aspect of the control method of the present disclosure is described. First, as shown in FIG. 9A, after determining the target speaker from the plurality of on-vehicle external speakers and the corresponding sound channel of the target speaker, the control method further includes the following processes.

At S510, second obstacle information near the target speakers is obtained.

At S520, in response to the target speaker facing the second obstacle, the target speaker facing the second obstacle is turned off, or at S530, in response to the target speaker facing the second obstacle, the vehicle is controlled to move to avoid the obstacle.

In the present disclosure, a good auditory experience is expected to be provided to the user. However, after encountering the second obstacle, an effect of sound or a sound wave can be uncontrollable, which can affect an effect of an entire sound field. Thus, in an ideal situation, no second obstacle is expected around the vehicle. In some other embodiments, at least no second obstacle in the direction of the vehicle facing the user. The second obstacle can be an object that is non-living and blocks the propagation of the sound wave (causing a large part of the sound wave to be reflected or refracted).

After determining the target speaker from the plurality of on-vehicle external speakers and the corresponding sound channel of the target speaker, step S510 needs to be performed to determine the second obstacle information near the target speaker. The second obstacle information near the speakers can also be obtained through the obstacle detection device and/or the on-vehicle camera device, which is not repeated here. If the target speaker faces the second obstacle, a second obstacle with a distance to the target speaker smaller than the predetermined distance can exist in a normal propagation path of the sound wave emitted by the target speaker. Then, the target speaker can be determined to face the second obstacle. If the target speaker facing the second obstacle exists, additional processes of process S520 or process S530 may need to be performed.

In process S520, the target speaker facing the second obstacle may be considered to be turned off. In some embodiments, since the turned-off target speaker faces the second obstacle, if the target speaker is not turned off, the target speaker cannot achieve the expected effect of the sound field due to the second obstacle. Therefore, in consideration of saving power consumption, the target speaker facing the second obstacle can be turned off.

In process S530, the movement of the vehicle may be considered to be controlled to avoid the second obstacle. In some embodiments, a good auditory effect is expected to be provided to the user. If there is enough space for the vehicle to move, a moving path avoiding the second obstacle can be determined as in process S413 to control the vehicle to avoid the second obstacle.

As shown in FIG. 9B, the left front speaker, the left rear speaker, and the rear speaker of the vehicle 110 face the second obstacle 900. In process S520, the left front speaker, the left rear speaker, and the rear speaker are directly turned off, and only the right front speaker, the right rear speaker, and the front speaker remain working.

As shown in FIG. 9C, the left front speaker, the left rear speaker, and the rear speaker of the vehicle 110 face the second obstacle 900 in the initial state. In process S530, the vehicle can be moved so that all the target speakers no longer face the second obstacle or the target speakers face the second obstacle as little as possible. A moving path 920 can be determined to avoid the blockage of the second obstacle 900 to control the vehicle to move to the position where the vehicle 110' is located. At the position where the vehicle 110' is located, all the target speakers no longer face the second obstacle and can still provide a full stereo surrounding sound field to ensure the auditory effect.

Figure 10:
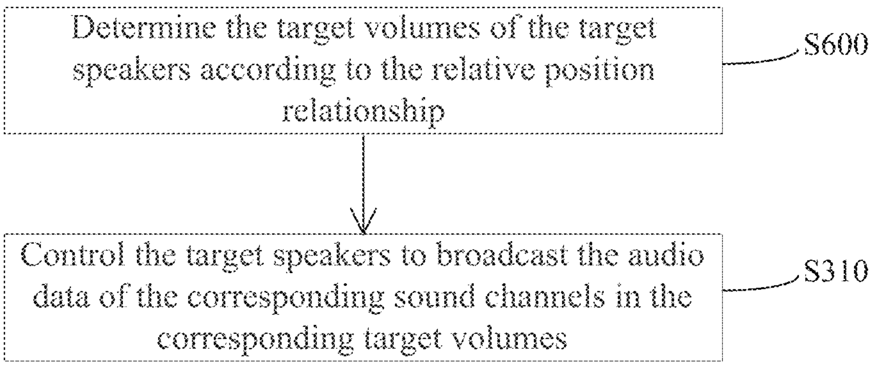
FIG. 10 is a schematic flowchart of another control method f according to some embodiments of the present disclosure.

Refer to FIG. 10, another aspect of the control method of the present disclosure is further described. As shown in FIG. 10, before process S300 of controlling the target speakers to play the audio data of the corresponding sound channels, the control method of the present disclosure further includes determining the target volumes of the target speakers according to the relative position relationship (S600).

In addition, process S300 is further refined into controlling the target speakers to play the audio data of the corresponding sound channels in the corresponding target volumes (S310).

The playback volumes of the target speakers can also affect the auditory sense of the user. Therefore, as shown in FIG. 10, the target volumes of the target speaker need to be determined according to the relative position relationship. According to physiological parameters of a human body, a better relative sound loudness range (for example, a range of 40-60 decibels) acceptable to the human ear can be preset. The target volume refers to a volume when the sound emitted by the on-vehicle external speaker of the vehicle reaches the user remaining in the preset sound loudness range (40 to 60 decibels) based on the relative position relationship between the user and the vehicle. The range of 40 to 60 decibels is illustrative and does not limit the present disclosure.

For example, the volumes of the target speakers will increase as the distance increases. In some embodiments, the noise in the surrounding environment of the user can be considered to adjust the volume dynamically.

For example, assume that a reference distance between the vehicle and the user can be A, and a corresponding volume can be X. The volume increases by $\Delta X$ for every increment AA in distance. The noise of the surrounding environment of the user can be n, and a noise volume compensation coefficient can be k. Then, when the distance is A', the volume $X'=X+\Delta X*(A'-A)/\Delta A+(n-50)*k$.

For example, when A=5 meters, X=20, $\Delta A$=5 meters, $\Delta X$=4, n=80, and k=0.2 are preset, the following situations can be calculated.

i. When A'=10 meters, X'=30.

ii. When A'=15 meters, X'=34.

iii. When A'=20 meters, X'=38.

On another hand, in the present disclosure, the relative position relationship between the vehicle and the user can be maintained at a relatively good preset status as much as possible. However, in some embodiments, for example, when too many obstacles exist, and the vehicle cannot plan to avoid the obstacles to reach the best relative position, or when the vehicle is parked at a position where an obstacle, such as a river, that cannot be avoided blocks the vehicle from the user, the volume can be adjusted to reduce the problem that the sound is soft since the movement of the vehicle is limited. Thus, the listening effect of the user can be ensured.

After the target volumes of the target speakers are determined, process S310 can be performed to control the target speakers to play the audio data of the corresponding sound channel at the corresponding target volume. Thus, a better auditory experience can be provided to the user while considering the volume.

Those skilled in the art can understand that, in the present disclosure, the audio data that the user wants to play can be processed into a plurality of sound channels. Thus, the target speakers can be controlled to play the audio data of the corresponding sound channels in process S300 and process S310 to provide the user with a good sound field to listen to the audio data.

The control method for the on-vehicle external speaker has been described above. In the present disclosure, the vehicle can be used as the large-scale soundbox capable of providing a stereo surrounding sound field, which can travel with the user and can be conveniently used on a spacious field. Thus, the application scene of the vehicle can be expanded, and the user experience can be improved. In the present disclosure, according to the relative position relationship between the user and the vehicle, the stereo surrounding sound field can be adjusted to improve the entire auditory effect. Thus, the user experience can be better. The present disclosure can provide a plurality of surrounding modes. Different surrounding modes can correspond to different numbers of speakers and different numbers of sound channels. Considering the power consumption problem of the speakers, the stereo surrounding sound effect can be achieved and the power consumption problem can be solved by setting different surrounding modes. In the present disclosure, based on the relative position relationship between the user and the vehicle, the vehicle can be controlled to move to proactively approach the user to provide a clearer stereo surrounding sound field with better effect. The moving path of the vehicle can be adjusted according to the obstacle situation to intelligently avoid the obstacle to move the vehicle to the position for providing the best sound effect for the user. In the present disclosure, the obstacle situation between the vehicle and the user and around the vehicle can be considered, and the position of the vehicle can be adjusted according to the obstacle situation to adjust the relative position between the vehicle and the user. Thus, a clearer stereo surrounding sound field with a better effect can be provided to the user. In some other embodiments, the speaker facing the obstacle can be turned off according to the obstacle situation to reduce the power consumption of the speaker without affecting the overall sound effect.

Another aspect of the present disclosure also provides a control device for on-vehicle audio and video playback, including at least one processor and a memory coupled to the at least one processor, the memory stores instructions that, when the instructions are executed by the at least one processor, cause the control device to execute the control method for the on-vehicle external speaker as shown in FIG. 3.

Figure 11:
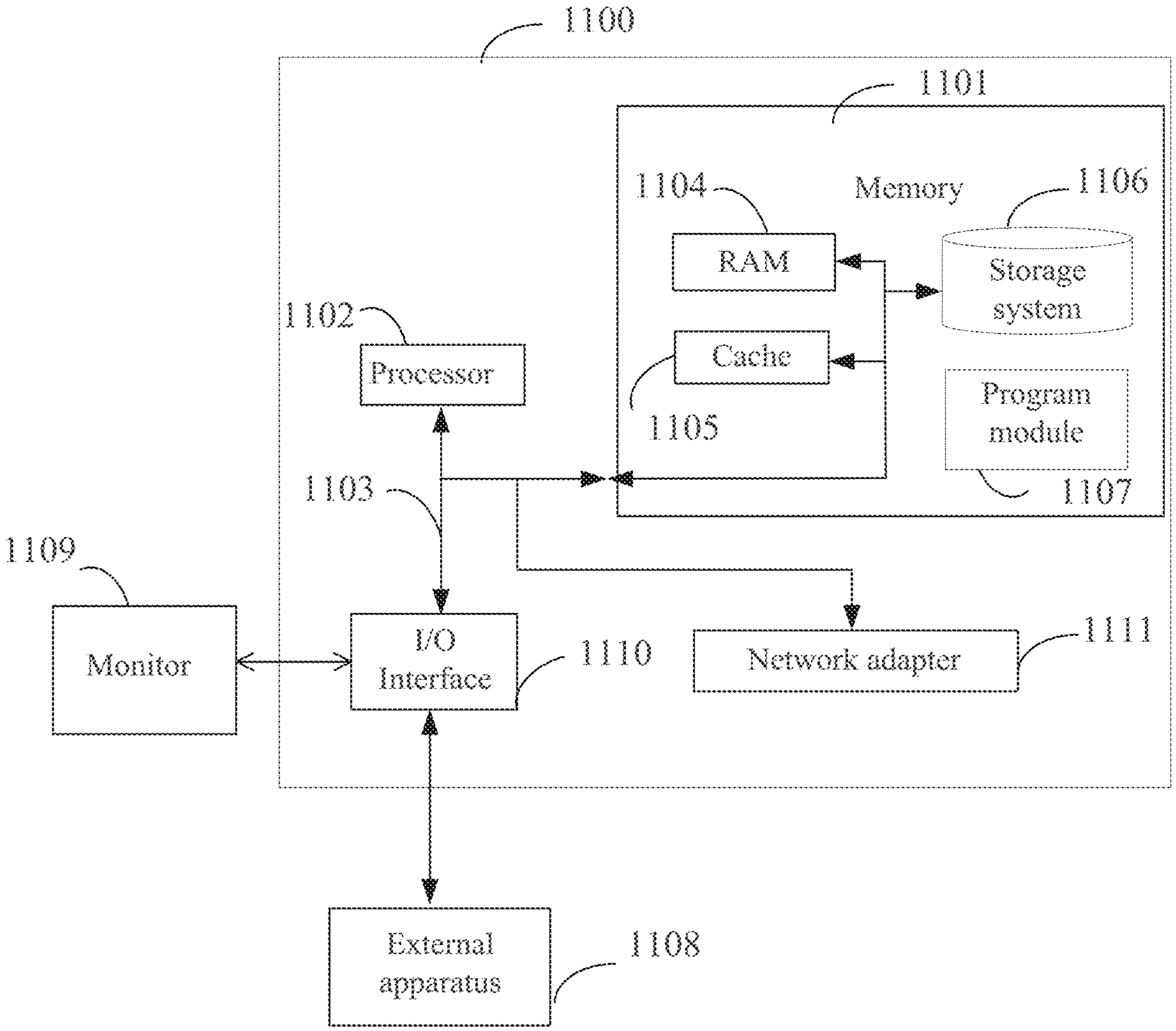
FIG. 11 is a schematic structural diagram of a control device for an on-vehicle external speaker according to some embodiments of the present disclosure.

As shown in FIG. 11, the control device 1100 for the on-vehicle external speaker of the present disclosure is described. As shown in FIG. 11, in some embodiments, the control device 1100 is represented in the form of a general-purpose computer apparatus, which is configured to implement the processes of any one of the control methods for the on-vehicle external speaker. For detailed description, reference can be made to the description of the control method for the on-vehicle external speaker, which is not repeated here.

The control device 1100 can include one or more memories 1101, one or more processors 1102, and a bus 1103 connecting different system assemblies (including the memories 1101 and the processors 1102).

The bus 1103 can include a data bus, an address bus, and a control bus. The product of the number of bits in the data bus and the working frequency is proportional to the data transfer rate. The number of bits in the address bus can be used to determine the maximum addressable memory space. The control bus (read/write) can indicate the type of the bus cycle and the time for completing the input/output operation. The processors 1102 are connected to the memories 1101 via the bus 1103 and are configured to implement the control method for the on-vehicle external speaker of any of the above embodiments.

The processors 1102 can be used as the computational and control core of the control device 1100 and are execution units for processing information and running programs. Operations of all software layers in the computer system can be mapped to operations of the processors 1102 through an instruction set. The processors 1102 can be configured to process instructions, perform operations, control time, and process data.

The memories 1101 can include various storage devices that store programs and data in the computer. The memories 1101 can include computer-readable media in the form of volatile storage devices. for example, random access memory (RAM) 1104 and/or high-speed cache 1105.

The RAM 1104 is an internal memory that directly exchanges data with the processors 1102. The RAM 1104 can be read from and written to at any time (except during refresh) and can be very fast. The RAM 1104 can be usually used as a temporary data storage medium for the operating system and other running programs. Once the power is cut off, the data stored can be lost. The high-speed cache 1105 can be a primary memory between the main memory and the processors 1102. The cache 1105 may have a small capacity and a speed much higher than the main memory. The speed of the cache 1105 can be close to the speed of the processors 1102.

The control device 1100 can include a plurality of memories 1101 and a plurality of processors 1102. Both the plurality of memories 1101 and the plurality of processors 1102 can have a distributed structure, for example, including memories and processors located at a local end and located in a cloud end at the back. The control method for the on-vehicle external speaker can be implemented by the local end and the cloud end. Further, in some embodiments of the distributed structure, a specific execution terminal can be adjusted in the processes according to actual situations. A specific solution for implementing the processes at the specific terminal should not limit the scope of the present disclosure.

The control device 1100 can also include other removable/non-removable and volatile/non-volatile computer system storage media. In some embodiments, the storage system 1106 can be configured to read and write non-removable and non-volatile magnetic media.

The memories 1101 can also include at least one set of program modules 1107. The program modules 1107 can be stored in memories 1101. The program modules 1107 can include, but are not limited to, an operating system, one or more applications, other program modules, and program data, where each or a combination of these examples can include the implementation of the network environment. The program modules 1107 can be configured to execute the functions and/or methods of embodiments of the present disclosure.

The control device 1100 can also communicate with one or more external apparatuses 1108. In some embodiments, the external apparatuses 1108 can include the on-vehicle external speaker 230, the on-vehicle camera device 221, the positioning device 222, the power system 240, the obstacle detection device 250, etc. The external apparatuses 1008 can also include a monitor 1109. When the control method for the on-vehicle external speaker is implemented, the control device 1100 can control the monitor 1109 to display the operation statuses of the target speakers.

The control device 1100 can also communicate with one or more apparatuses that enable the user to interact with the control device 1100 and/or with any apparatuses (e.g., network cards, modems, etc.) that allow the control device 1100 to communicate with one or more other computation apparatuses. The communication can be performed through an input/output (I/O) interface 1110.

The control device 1100 can also communicate with one or more networks (such as a local area network (LAN), a wide area network (WAN), and/or a public network, e.g., the Internet) through a network adapter 1111. As shown in FIG. 11, the network adapter 1111 communicates with other modules of the control device 1100 through the bus 1103. Although not shown in the figure, other hardware and/or software modules can be used in connection with the control device 1100. The other hardware and/or software modules can include but are not limited to microcode, apparatus drivers, redundant processing units, external disk drive arrays, RAID systems, tape drives, data backup storage systems, etc.

Another aspect of the present disclosure also provides a computer-readable storage medium storing computer programs that, when executed by a processor, cause the processor to perform the processes of the control method for the on-vehicle external speaker of any one of embodiments of the present disclosure. For the description of the processes of the control method, reference can be made to above, which are not repeated here. In addition, the computer-readable storage medium can be in a system format, which includes a plurality of computer-readable storage sub-media. Thus, the processes of the control method for on-vehicle video and audio playback can be implemented through the plurality of computer-readable storage media.

Various explanatory logic modules and circuits of embodiments of the present disclosure can be implemented or executed directly by a processor, a digital signal processor (DSP), an application-specific integrated circuit (ASIC), a field programmable gate array (FPGA) or other programmable logic device, discrete gate or transistor logic, a discrete hardware assembly, or any combination for performing the functions of the present disclosure. The processor can be a microprocessor. In some other embodiments, the processor can be any processor, controller, microprocessor, or state machine. The processor can also be implemented as a combination of computer apparatuses, e.g., a combination of the DSP and the microprocessor, a plurality of microprocessors, one or more microprocessors cooperating with the DSP core, or any other such device.

The method or processes of the algorithm of embodiments of the present disclosure can be directly embodied in the hardware, the software module executed by the processor, or a combination thereof. The software modules can be stored in RAM storage, flash memory, ROM storage, EPROM storage, EEPROM storage, registers, hard drives, removable disks, CD-ROMs, or any other form of storage medium known in the art. Exemplary storage media are coupled to processors to enable the processors to read and write information from/to the storage medium. In some other embodiments, the storage medium can be integrated into the processor. The processor and the storage medium can be included in the ASIC. The ASIC can be arranged in the user terminal. In some other embodiments, the processor and the storage medium can be arranged in the user terminal as discrete assemblies.

In some embodiments, the functions described may be implemented in hardware, software, firmware, or any combination thereof. If the functions are implemented as a computer program product in software, the functions can be used as one or more pieces of program instructions or codes stored in the computer-readable medium or transmitted via such a medium. The computer-readable medium can include both a computer storage medium and a communication medium, for example, any medium for transferring the computer program from one place to another place. The storage medium can be any available medium that can be accessed by the computer. For example, the computer-readable medium can include RAM, ROM, EEPROM, CD-ROM, or other optical disk storage, magnetic disk storage, or other magnetic storage devices, or any other medium that can be used to carry or store program codes in the form of instructions or data structures. Any connection can be referred to as a computer-readable medium. For example, if the software is transferred via a coaxial cable, a fiber optic cable, twisted pair cable, a digital subscriber line (DSL), or a wireless technology such as infrared, wireless, and microwave from a web site, a server, or other remote sources, the coaxial cable, the fiber optic cable, the twisted pair cable, the DSL, or the wireless technology such as infrared, wireless, and microwave can be included in the definition of the medium. Disk and disc can include compact discs (CD), laser discs, optical discs, digital versatile discs (DVD), floppy disks, and Blu-ray discs are used in the present disclosure. Disk can be often used to reproduce data in a magnetic manner, and disc can be used to reproduce data in an optical manner. A combination thereof can also be included in the scope of the computer-readable medium.

The above description is provided to enable any those skilled in the art to practice the various aspects described here. The scope of the present disclosure is subject to the appended claims and is not limited to the specific structure and assembly of embodiments of the present disclosure. Those skilled in the art can make various modifications and changes to embodiments of the present disclosure. These modifications and changes are within the scope of the present disclosure.

What is claimed is:

1. A control method for an on-vehicle external speaker comprising:

in response to activation of an on-vehicle speaker mode, obtaining a relative position relationship between a user and a vehicle at a predetermined time interval, the relative position relationship including a relative distance between the user and the vehicle, the vehicle including a plurality of on-vehicle external speakers that emit sound to outside the vehicle;

in response to the relative distance exceeding a predetermined distance, generating a moving path of the vehicle and controlling the vehicle to move according to the moving path;

determining target speakers from the plurality of on-vehicle external speakers and corresponding sound channels at least based on the relative position relationship; and controlling the target speakers to broadcast audio data of the corresponding sound channels.

2. The control method according to claim 1, wherein determining the target speakers from the plurality of on-vehicle external speakers and the corresponding sound channels further includes:

based on the on-vehicle speaker mode, determining a number of the target speakers and a number of the sound channels;

based on the relative position relationship, determining that an on-vehicle external speaker meeting a predetermined condition to be a center speaker, and determining a corresponding sound channel of the center speaker to be a center sound channel, the center speaker belonging to the target speakers; and using the center speaker as a reference, determining other target speakers and sound channels corresponding to the other target speakers according to the number of the target speakers and the number of the sound channels.

3. The control method according to claim 2, wherein determining the on-vehicle external speaker meeting the condition to be the center speaker further includes:

obtaining an angle range formed by any two neighboring speakers of the plurality of on-vehicle external speakers relative to a center of the vehicle body; and based on the relative position relationship, determining the any two neighboring speakers corresponding to the angle range where the user is located to be center speakers.

4. The control method according to claim 2, wherein determining the on-vehicle external speaker meeting the condition to be the center speaker further includes:

based on the relative position relationship, determining distances of the plurality of on-vehicle external speakers relative to the user; and determining an external speaker closest to the user to be a center speaker.

5. The control method according to claim 2, wherein the on-vehicle speaker mode includes:

a full surrounding mode; and a half surrounding mode, a number of target speakers and a number of sound channels corresponding to the half surrounding mode being smaller than a number of target speakers and a number of sound channels of the full surrounding mode.

6. The control method according to claim 1, wherein:
the relative position relationship further includes an angle of the user relative to the vehicle; and
generating the moving path of the vehicle further includes:
generating an initial moving path based on the relative distance between the user and the vehicle, the angle of the user relative to the vehicle, and the predetermined distance;
obtaining obstacle information on the initial moving path, the obstacle information indicating an obstacle on the initial moving path; and
in response to the obstacle existing on the initial moving path, adjusting the initial moving path based on the obstacle information to generate the moving path.

7. The control method according to claim 1, further comprising, before controlling the target speakers to broadcast the audio data of the corresponding sound channels:
according to the relative position relationship, determining target volumes of the target speakers;
wherein controlling the target speakers to broadcast the audio data of the corresponding sound channels further includes:
controlling the target speakers to broadcast the audio data of the corresponding sound channels at the corresponding target volumes.

8. The control method according to claim 1, further comprising, after determining the target speakers from the plurality of on-vehicle external speakers and the corresponding sound channels:
obtaining obstacle information near the target speakers, the obstacle information indicating an obstacle near the target speakers; and
in response to a target speaker facing the obstacle, turning off the target speaker facing the obstacle, or controlling the vehicle to move to avoid the obstacle.

9. The control method according to claim 1, wherein obtaining the relative position relationship between the user and the vehicle further includes:
obtaining the relative position relationship between the user and the vehicle through an on-vehicle camera device; and/or
obtaining the relative position relationship between the user and the vehicle through a mobile apparatus of the user and a positioning device of the vehicle.

10. A control device for an on-vehicle external speaker comprising:
one or more processors; and
one or more memories coupled with the one or more processors and storing instructions that, when executed by the one or more processors, cause the one or more processors to:
in response to activation of an on-vehicle speaker mode, obtain a relative position relationship between a user and a vehicle at a time interval, the relative position relationship including a relative distance between the user and the vehicle, the vehicle including a plurality of on-vehicle external speakers that emit sound to outside the vehicle;
in response to the relative distance exceeding a predetermined distance, generate a moving path of the vehicle and control the vehicle to move according to the moving path;
determine target speakers from the plurality of on-vehicle external speakers and corresponding sound channels at least based on the relative position relationship; and
control the target speakers to broadcast audio data of the corresponding sound channels.

11. The control device according to claim 10, wherein the one or more processors are further configured to:
based on the on-vehicle speaker mode, determine a number of the target speakers and a number of the sound channels;
based on the relative position relationship, determine that an on-vehicle external speaker meeting a condition to be a center speaker, and determine a corresponding sound channel of the center speaker to be a center sound channel, the center speaker belonging to the target speakers; and
using the center speaker as a reference, determine other target speakers and sound channels corresponding to the other target speakers according to the number of the target speakers and the number of the sound channels.

12. The control device according to claim 11, wherein the one or more processors are further configured to:
obtain an angle range formed by any two neighboring speakers of the plurality of on-vehicle external speakers relative to a center of the vehicle body; and
based on the relative position relationship, determine the any two neighboring speakers corresponding to the angle range where the user is located to be center speakers.

13. The control device according to claim 11, wherein the one or more processors are further configured to:
based on the relative position relationship, determine distances of the plurality of on-vehicle external speakers relative to the user; and
determine an external speaker closest to the user to be a center speaker.

14. The control device according to claim 11, wherein the on-vehicle speaker mode includes:
a full surrounding mode; and
a half surrounding mode, a number of target speakers and a number of sound channels corresponding to the half surrounding mode being smaller than a number of target speakers and a number of sound channels of the full surrounding mode.

15. The control device according to claim 10, wherein:
the relative position relationship further includes an angle of the user relative to the vehicle; and
the one or more processors are further configured to:
generate an initial moving path based on the relative distance between the user and the vehicle, an angle of the user relative to the vehicle, and the distance;
obtain obstacle information on the initial moving path, the obstacle information indicating an obstacle on the initial moving path; and
in response to the obstacle existing on the initial moving path, adjust the initial moving path based on the obstacle information to generate the moving path.

16. An onboard external speaker system comprising:
a positioning device arranged at a vehicle;
a plurality of onboard external speakers arranged at the vehicle emitting a sound to outside the vehicle;
a control device communicatively connected to the positioning device and the plurality of onboard external speakers and configured to:

in response to activation of an on-vehicle speaker mode, obtain relative position relationship between a user and the vehicle through a mobile apparatus of the user and the positioning device at a predetermined time interval, the relative position relationship including a relative distance between the user and the vehicle;

in response to the relative distance exceeding a predetermined distance, generate a moving path of the vehicle and control the vehicle to move according to the moving path through a power system communicatively connected to the control device;

determine a target speaker from the plurality of on-vehicle external speakers and a sound channel corresponding to the target speaker at least based on the relative position relationship; and control the target speakers to play audio data of the corresponding sound channel.

17. The onboard external speaker system according to claim 16, further comprising:

an obstacle detection device;

wherein the control device is further configured to, after determining the target speakers from the plurality of on-vehicle external speakers and the sound channels corresponding to the target speakers:

obtain obstacle information near the target speakers based on the obstacle detection device; and in response to a target speaker facing the obstacle, close the target speaker facing the obstacle or control the vehicle to move to avoid the obstacle through the power system.

* * * * *